United States Patent Office 2,951,789
Patented Sept. 6, 1960

2,951,789

PRESERVATIVE COMPOSITION FOR CELLULOSIC MATERIALS COMPRISING HEAVY METAL SOAPS

James F. McCants, Tulsa, Okla., assignor to Pan American Petroleum Corporation, a corporation of Delaware No Drawing. Filed Dec. 27, 1955, Ser. No. 555,310

3 Claims. (Cl. 167—38.5)

The present invention relates to oil-soluble metal soaps of carboxylic acids derived from a special source. More particularly, it is concerned with a selected fraction of oil-soluble acids produced in hydrocarbon synthesis in the preparation of certain heavy metal salts which in turn can be employed as preservatives for cellulosic and other types of materials.

The protection of materials from harmful attack by microorganisms, insects and various forms of marine life has been a problem of long standing. Where appearance of the treated material was of secondary importance creosote and various other phenol-containing compositions or phenolic derivatives have been used with satisfactory results. Preservatives such as creosote and the like, however, in addition to being objectionable from the standpoint of appearance of the treated material, tends to leach out from the surface of the treated object owing to weathering leaving the outer layer thereof exposed to the action of fungi, etc. and/or insects. Moreover, preservatives such as creosote are toxic on contact to the higher forms of plant and animal life. Other preservative materials such as the metal soaps of higher molecular weight acids have been employed with varying degrees of success. The principal disadvantage of such materials, however, has been their generally poor penetrating properties.

I have now discovered that acid mixtures produced in hydrocarbon synthesis, particularly mixtures such as the $C_{13}$ and higher molecular weight acid fraction obtained thereby, can be converted into the corresponding heavy metal soaps of said acids, e.g., copper, lead or zinc soaps, to produce compositions having highly desirable and unique properties as a pesticide in the preservation of cellulosic materials such as cotton fabrics, wood, etc. I have found that metal soaps of the type herein contemplated possess numerous advantages over other compositions which have been previously used for the preservation of cellulosic materials. For example the compositions of my invention are nontoxic, on contact, to the higher forms of plant and animal life. The vapor pressure of the previously used preservatives is much higher than the metal soaps defined and claimed herein. This property renders the protective power of my new preservatives of much longer duration than the materials previously used for this purpose. Also, the water solubility for these new preservatives is much less than creosote or the various chlorophenols thereby also rendering the preservative effect of the metal soaps claimed herein much longer lasting. Moreover, the metal soaps of my invention are outstandingly superior in their ability to penetrate wood and similar materials.

The metal soaps of my invention are obtained, as previously indicated, preferably from a $C_{13}+$ acid fraction produced in hydrocarbon synthesis. Such fraction, prior to my discovery, was of such a character that purification thereof was impractical owing to the highly complex nature of its composition. Because of this fact, the aforesaid fraction was considered to be of no value and regarded as a waste stream. A typical article referring to this well known prior art $C_{13}$ acid fraction is Industrial and Engineering Chemistry, vol. 45, pages 343–362, January–April 1953.

The $C_{13}+$ molecular weight acid fraction used in the preparation of the preservatives of my invention is a byproduct of the extraction process employed in recovering oil-soluble chemicals from the oil phase produced in hydrocarbon synthesis. In this extraction process the free acids in raw synthesis oil produced, for example, by the reaction of hydrogen with carbon monoxide in the presence of a fluidized bed of iron catalyst, are first neutralized by the addition of a 15 to 20 percent aqueous caustic solution. Normally, sufficient base is added at this point to bring the pH of the resulting aqueous phase to a value of from about 8.0 to about 10.5. The aqueous phase thus produced contains principally salts of the oil-soluble hydrocarbon synthesis acids together with some solubilized nonacid chemicals and hydrocarbons. The resulting neutral oil layer containing the bulk of the chemicals is then extracted with an aqueous soap solution to recover said chemicals in accordance with a procedure outside the scope of my invention. The aforesaid aqueous phase, however, contains the $C_{13}+$ acid fraction used in the preparation of the metal soaps of my invention. This aqueous phase is first acidified with a suitable mineral acid such as, for example, sulfuric acid to convert the salts into their corresponding acids which subsequently separate in the form of an upper organic layer. The latter is removed from the lower aqueous phase and subjected to a stripping or distilling operation whereby at least the major portion of the acids present ranging in carbon content of from 4 to about 12 carbon atoms are taken overhead. The resulting residue is so high boiling that further distillation thereof is impractical. This fraction, in addition to containing the $C_{13}$ and higher molecular weight acids, also contains usually from about 25 to about 60 percent, and typically from 30 to about 50 percent heavy hydrocarbons as contaminants. The presence of these hydrocarbon impurities fortuitously seems to exhibit a synergistic effect in that better penetration and water repellency are demonstrated by the metal soaps compositions of my invention than I have found to be possessed by other metal soaps. These hydrocarbons are generally comparable in molecular weight to the acids present in the fraction employed, however, a substantial portion of the hydrocarbons present may be of higher molecular weight than various of the acids present. Ordinarily, it may be said that the molecular weight distribution of the hydrocarbons present is such that they boil within the same general range as the $C_{13}+$ acid fraction.

The $C_{13}+$ acid fraction recovered from hydrocarbon synthesis oil phase as generally outlined above is used in preparing the metal soaps of my invention by first mixing therewith sufficient caustic, usually in the form of a 20 or 25 percent aqueous solution, to substantially completely neutralize the acids present. These soaps are further diluted with water, for example, down to a concentration of 15 or 20 percent, heated to about 180° F. and thereafter converted by a double decomposition reaction, into the corresponding heavy metal soaps by admixture with a hot (180° F.) aqueous solution of a salt of the desired heavy metal. The heavy metal soaps thus formed are water insoluble and may be separated from the aqueous phase by means of filtration or any other convenient means. The soaps thus produced are then dissolved in a suitable solvent, as for example, a hydrocarbon such as toluene, xylene or petroleum solvents, in an amount sufficient to give the desired concentration of heavy metal and are thereafter ready for use. In general, it may be said that the quantity of metal soap employed in such solutions varies rather widely. However, for the majority of uses I have found that soap concentrations ranging in amounts such that from about 0.1 to about 5.0 weight percent of the heavy metal is present, are entirely satisfactory. In most instances metal concentrations of from about 0.2 to about 2.0 weight percent are preferable. Generally, the zinc and lead soaps, for effectiveness equal to that of the copper soaps, should be used in a concentration corresponding approximately to about twice that of the copper soaps.

Soaps of the type claimed herein, in addition to constituting very effective preservatives of cellulosic materials, may be employed as the active ingredient of antifouling marine paints, etc. Also, where attack by certain forms of marine life is encountered, as in the case of under-water pipe lines, such difficulties may be avoided or materially reduced by incorporating the metal soaps of my invention into the coating dope used in the basic protection of such lines.

In determining the effectiveness of these new metal soaps I have carried out a number of tests to establish the ability of such compositions to protect cellulosic materials from microbiological attack. Other work has been done to determine various auxiliary properties of these preservatives which must be exhibited to a substantial degree in order to render the preservative of practical value. Such properties include water solubility and ability to penetrate various objects to be protected. The following examples are included to illustrate the very desirable characteristics of the soaps of my invention and to give a comparison showing the relative efficiency of said soaps and similar materials previously used for such purpose.

EXAMPLE I

Accelerated tests were carried out to compare relative inhibition of microbiological growth exhibited by the soaps of my invention and previously known metal soaps including copper naphthenate, copper oleate, copper palmitate and copper stearate. Individual cotton muslin strips 2" x 6" were impregnated with separate solutions containing 2 weight percent of copper in the form of one of the soaps named immediately above. Also one solution employed contained 2 weight percent copper in the form of a soap of the $C_{13}+$ acid fraction obtained as described above from hydrocarbon synthesis. Xylene was used as the solvent for the soaps tested. The strips thus impregnated were then buried in moist soil at 100° F.; also unimpregnated muslin strips were buried to serve as a control. After 60 days the samples were recovered and inspected. The control strips had completely decomposed and disappeared. The strips impregnated with copper oleate, copper palmitate and copper stearate were in an advanced state of decomposition whereas the strips individually impregnated with copper soaps of the aforesaid $C_{13}+$ acid fraction were still in very good condition. Zinc soaps corresponding to the above named copper soaps were also tested in a similar manner and gave results comparable in all respects to their copper analogs.

EXAMPLE II

Penetration tests using copper soaps of naphthenic, oleic, stearic and palmitic acids were compared to similar tests performed with the copper soaps of the $C_{13}+$ acid fraction from hydrocarbon synthesis. In these tests, solutions of the various copper soaps were prepared, employing toluene as the solvent, and adjusted to a concentration of 2 weight percent copper. The penetration tests were carried out in accordance with the procedure developed to establish Interstate Commerce Commission specifications. (See "The Alkaline Earth and Heavy Metal Soaps," by Elliot, No. 103 ACS Monograph Series, published by Reinhold Publishing Company, 1946, page 265.) The following results were obtained:

Table I

| Soap Solution | Penetration— inches [1] |
|---|---|
| Copper stearate | 3/16 |
| Copper oleate | 5/16 |
| Copper naphthenate | 1 5/16 |
| Copper soap HCS $C_{13}+$ Acid Fraction | 1 5/16 |

[1] In conformity with the tests, several penetration determinations were made using each soap solution. The penetration rates shown above represent average readings.

Zinc soaps of the same group of acids appearing in the above table were also subjected to similar tests and gave results comparable in all respects to those obtained with the respective copper soaps.

Water repellency is a property much desired in preserving cellulosic materials for the reasons previously pointed out. Preservatives such as the copper soaps have considerable water repellency owing to the presence of the water insoluble copper soaps in relatively high concentration in the object to be protected. This property of the copper soaps of my invention and comparison thereof with other materials previously employed as wood preservatives is shown in the example below.

EXAMPLE III

In accordance with the procedure developed to establish Interstate Commerce Commission requirements for wood preservative water repellency characteristics (see "The Alkaline Earth and Heavy Metal Soaps," by Elliot, No. 103 ACS Monograph Series, published by Reinhold Publishing Company, 1946, pages 264–265) such property of copper soaps of the hydrocarbon synthesis $C_{13}+$ acid fraction and the copper soaps of naphthenic, palmitic, stearic and oleinic acids was determined. In this work the soaps were used in xylene solutions in concentrations such as to give 2 weight percent copper. The results obtained in these tests are shown below:

Table II

| Soap used—2% Copper in Xylene solvent | Weight Percent Gain After Water Immersion. Average of 2 Samples |
|---|---|
| Copper oleate | 18 |
| Copper stearate | 20 |
| Copper naphthenate | 13 |
| Copper soap HCS $C_{13}+$ acids | 8 |
| Control—no treatment | 35 |

Zinc soaps of the various acids named above were likewise tested under conditions identical with those employed in the case of the copper soaps. The water repellency characteristics of the zinc soaps were found to be substantially identical with those of their corresponding copper analogs.

From the foregoing description and examples it will be seen that the particular heavy metal soaps of my invention possess properties which render them highly desirable as preservatives for cellulosic materials and for related uses. Numerous variations and modifications of the aspects of my invention, as described herein, will occur to those skilled in the art. Accordingly, any such modifications or variations embodying heavy metal soaps of the type contemplated herein are to be considered as lying within the scope of my invention.

I claim:

1. As a new composition of matter heavy metal soaps of an acid fraction produced in the synthesis of hydrocarbons by the reaction of hydrogen with carbon monoxide in the presence of a fluidized bed of alkali-promoted iron catalyst wherein the acid component of said fraction consists essentially of $C_{13}$ and higher molecular weight acids and is contaminated with from about 25 to about 60 percent of high boiling hydrocarbons produced in said synthesis and boiling substantially in the same range as the acids in said fraction, said acid fraction having been obtained by subjecting the free acids present in the oil phase, produced in said synthesis, to distillation to force overhead a mixture consisting essentially of the $C_{12}$ and lower molecular weight acids and leaving a residue of $C_{13}$ and higher molecular weight acids together with said contaminating hydrocarbons, said heavy metals being selected from the group consisting of copper, zinc and lead.

2. The new composition of matter of claim 1 in which the heavy metal is copper and the contaminating hydrocarbons are present in a concentration ranging from about 30 to about 50 percent.

3. The new composition of matter of claim 1 in which the heavy metal is zinc and the contaminating hydrocarbons are present in a concentration ranging from about 30 to about 50 percent.

References Cited in the file of this patent

UNITED STATES PATENTS

| | | |
|---|---|---|
| 993,827 | Ellis | May 30, 1911 |
| 1,481,012 | Kalusowski | Jan. 15, 1924 |
| 1,679,919 | Rogers et al. | Aug. 7, 1928 |
| 2,553,364 | Fasce | May 15, 1951 |

OTHER REFERENCES

Elliot: "The Alkaline Earth and Heavy Metal Soaps," Monograph Series No. 103, Reinhold Pub. Co., 1946, p. 146, and chapter 4.

Industrial and Engineering Chemistry, vol. 45, pp. 434–362, January–April 1953.